United States Patent
Greene et al.

[15] 3,686,307
[45] Aug. 22, 1972

[54] CONVERSION OF NITRILES TO AMIDES IN THE PRESENCE OF ALKALINE CATALYSTS

[72] Inventors: Janice L. Greene, Chagrin Falls; Rosalind E. Clark, North Randall, both of Ohio

[73] Assignee: Standard Oil Company, Cleveland, Ohio

[22] Filed: Feb. 7, 1969

[21] Appl. No.: 797,660

[52] U.S. Cl. ............260/561 N, 260/404, 260/557 R, 260/558 R, 260/558 A, 260/561 R, 260/561 A
[51] Int. Cl. ............................................C07c 103/58
[58] Field of Search...............260/558, 559, 561, 557

[56] References Cited

UNITED STATES PATENTS 3,257,420  6/1966  Szarvasi......................260/558
3,282,964  11/1966  Szarvasi......................260/558

OTHER PUBLICATIONS

Angelescu I, Academie Roumaine, Bull. de la Section Scientifique, vol. 22, pp. 221– 29 (1940)
Angelescu II, Acad. Roumaine, Bull. de la Sect. Scientifique vol. 22, pp. 411– 19 (1940)
Angelescu III, Acad. Repub. Populare Romine, Stodu Cercetari chim, vol. 9, p. 459– 75 (1961)
Angelescu IV, Acad. Rep. Populare Romine, Studii Cercetari Chim vol. 9, p. 477– 84 (1961)
Angelescu V, Acad. Rep. Populare Romine, Studii (Ercetari Chim, vol. 9, p. 485– 92 (1961)
Angelescu VI, Acad. de la Rep., Populare Roumaine, Revue de Chemie, vol. 7, p. 655– 63 (1962)

*Primary Examiner*—Henry R. Jiles
*Assistant Examiner*—Harry I. Moatz
*Attorney*—John F. Jones

[57] ABSTRACT

A nitrile, such as methacrylonitrile, is converted to the corresponding carboxamide, such as methacrylamide, in high yield at an elevated temperature in the presence of water, a tertiary alcohol, such as t-butyl alcohol, and an alkaline catalyst, such as lithium hydroxide.

5 Claims, No Drawings

CONVERSION OF NITRILES TO AMIDES IN THE PRESENCE OF ALKALINE CATALYSTS

This invention concerns the alkaline hydrolysis of nitriles to amides and more particularly relates to the hydrolysis of nitriles to amides in high yield in the presence of water and catalytic amounts of certain alkali metal hydroxides. A more specific embodiment of the instant process includes a tertiary alcohol in the reaction mixture of nitrile, water and metal hydroxide catalyst. The most common method for converting nitriles to amides is the partial hydrolysis of nitriles with water in the presence of a strong mineral acid, such as sulfuric acid. The amide in the reaction product must be separated by rather complicated and time consuming methods, including forming insoluble salts of the acid moiety, ion exchange removal of the acid moiety, and the like. The reaction and work-up conditions used in the formation of amides from olefinically unsaturated nitriles, such as acrylonitrile and methacrylonitrile, by the usual acid hydrolysis procedure is particularly critical because of the tendency of the nitriles, amides and acids to undergo reaction, such as polymerization, at the olefinic double bond.

The use of alkaline catalysts in the hydrolysis of nitriles to carboxamides is shown by the prior art to be an undesirable process compared with acid hydrolysis because "If the saponification is carried out with alkalies, the amide step cannot be caught so well." (See *Organic Preparations* by C. Weygand, page 271.) Thus, alkaline hydrolysis of nitriles as contemplated by the prior art leads to mixtures of both the corresponding carboxamide and carboxylic acid. The so-called "Radziszewski" reaction whereby nitriles are converted to the corresponding carboxamides in the presence of slightly alkaline water containing hydrogen peroxide (see *Organic Chemistry* by Fieser and Fieser, 3rd edition, page 241) is distinguished from the instant process in that the instant process employs no hydrogen peroxide.

The process of the present invention is quite simple insofar as the number of steps and type of equipment needed to carry it out are concerned. The process of the present invention provides amides, and particularly olefinically unsaturated amides, in very high yields and purity; the amides are easily recovered and the metal hydroxide catalyst can readily be recycled. This latter feature is of significant economic advantage over the presently known acid process for nitrile hydrolysis wherein the acid ultimately must be converted to a salt which cannot practically be converted back to acid to serve as recycle catalyst.

Nitriles are converted to amides in our process according to the following simplified equation:

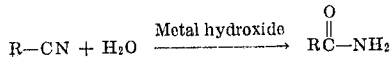

In this process R can be any hydrocarbon group having from one to 30 carbon atoms and there can be more than one —CN group in the nitrile molecule. Specific examples of nitriles which can be converted to the corresponding amides by the instant process include acetonitrile, propionitrile, the butyronitriles and generally compounds of the type R—CN wherein R is an alkyl group having from one to 10 carbon atoms; the aromatic nitriles such as benzonitrile, naphthonitrile, and generally compounds of the type R—CN wherein R is an aromatic group having from six to 20 carbon atoms; olefinic nitriles such as acrylonitrile, methacrylonitrile, ethacrylonitrile, crotononitrile, alpha-chloroacrylonitrile, alpha-bromoacrylonitrile and compounds of the type R—CN wherein R is an olefinic group having from two to 10 carbon atoms; polynitriles such as oxalonitrile, malononitrile, succinontrile, glutaronitrile, adiponitrile, pimelonitrile, suberic nitrile, sebacic nitrile, fumaronitrile, maleonitrile, methylene glutaronitrile, cyclobutane-1,2-dicyanide, vinylidene cyanide and others. Most preferred nitriles for the present process are those having the formula $R_1-(CN)_n$ wherein $R_1$—is an alkylene group having from one to six carbon atoms, an aromatic group or an olefinic group having from two to six carbon atoms and $n$ is one or two. Particularly preferred in the process of this invention are nitriles having the structure R—CN wherein R is an aromatic group having from six to eight carbon atoms or an aliphatic or olefinic group having from one to eight carbon atoms.

The alkaline catalysts useful in the present invention are lithium hydroxide, lithium carbonate, lithium bicarbonate, sodium hydroxide, sodium carbonate, sodium bicarbonate and the like. The most preferred catalysts are lithium hydroxide and sodium hydroxide.

As was mentioned earlier, it is also often desirable and even preferred to include a tertiary alcohol such as t-butanol in the nitrile hydrolysis reaction mixture. Although t-butanol is preferred because of its ready availability and low cost, other tertiary alcohols, such as t-amyl alcohol, the t-hexyl alcohols, the t-heptyl alcohols and the t-octyl alcohols, can also be used separately or in combination in the process of this invention.

The process of the present invention can be carried out in conventional equipment at temperatures in the range of from about 40° C. to 310° C. and more preferably in the range of from about 135° C. to 310° C. Reaction pressures in the range of from atmospheric to about 1,500 p.s.i.g. can be employed. The length of the reaction period is dependent upon the reaction temperature, and thus the higher temperatures of reaction result in shortened reaction times.

The ratios of reactants employed in the instant process are from about 0.001 to 1.0 mole of catalyst per mole of nitrile and preferably 0.005 to 0.5 mole of catalyst per mole of nitrile, from about 0.1 to 10 moles and preferably from 0.5 to 5.0 moles of tertiary alcohol per mole of nitrile, and from about 1 to 10 moles and preferably from 2 to 8 moles of water per mole of nitrile.

The process of this invention is further illustrated in the following examples wherein the amounts of the various ingredients are expressed in parts by weight unless otherwise indicated.

EXAMPLE I

In each of eight stainless steel autoclaves were placed 4.73 grams of freshly distilled methacrylonitrile, 5.07 grams of distilled water, 0.120 gram of lithium hydroxide and 5.09 grams of t-butyl alcohol. The autoclaves were sealed and placed into a rotating aluminum block and were agitated at 200° C. for 15 minutes each, followed by quenching in an ice bath. The contents of the autoclaves were removed, filtered and combined to give 112 grams of clear, colorless liquid containing 16.9 grams of methacrylamide and 23.5 grams of methacrylonitrile as determined by gas chromatography. This represents a 35.2 percent total conversion of methacrylonitrile with 93 percent selectively to methacrylamide.

The methacrylamide in the combined autoclave effluent was isolated by crystallization at 10° C. of the residue remaining after distillation of volatile matter from the effluent at atmospheric pressure and 78° C. The first crop of pure white methacrylamide crystals weighed 4 grams and was found to melt at 104°–106° C. Further concentration of the filtrate gave an additional 11.3 grams of methacrylamide. The methacrylamide was identified by infrared analysis.

EXAMPLE II

The procedure of Example I was repeated using lithium hydroxide, methacrylonitrile, water and t-butyl alcohol in the mole ratio of 0.07:1:3:1, respectively, and a 60-minute reaction time. There was produced a 39.4 percent conversion of the methacrylonitrile with a 99 percent yield of methacrylamide.

EXAMPLE III

A repeat of Example II employing two moles of t-butyl alcohol per mole of methacrylonitrile and a 30-minute reaction time produced a 24.2 percent conversion of methacrylonitrile and a 100 percent yield of methacrylamide.

EXAMPLE IV

Example II was repeated using 4 moles of water per mole of methacrylonitrile and a reaction time of 15 minutes to produce a 39.5 percent conversion of methacrylonitrile and a yield of 100 percent methacrylamide.

EXAMPLE V

Example II was repeated using 6 moles of water per mole of methacrylonitrile and a reaction time of 15 minutes to produce a 51.8 percent conversion of methacrylonitrile and 100 percent yield of methacrylamide.

EXAMPLE VI

The procedure of Example IV was used except that the reaction temperature was 310° C. to produce a 38.1 percent conversion of methacrylonitrile and a 78.2 percent yield of methacrylamide.

EXAMPLE VII

The procedure of Example IV was repeated except that 0.005 mole of lithium hydroxide was employed which produced a conversion of 16.2 percent of methacrylonitrile and a yield of methacrylamide of 79.2 percent.

EXAMPLE VIII

The procedure of Example II was repeated except that no t-butyl alcohol and a reaction time of 15 minutes were employed to produce a 9.2 percent conversion of methacrylonitrile and a 66.2 percent yield of methacrylamide. This example is outside the scope of the present invention.

EXAMPLE IX

A. Example IV was repeated with the exception that sodium hydroxide was used in place of the lithium hydroxide to produce a 34.1 percent conversion of methacrylonitrile and a yield of 95.4 percent methacrylamide.

B. Procedure A. of this example was repeated except that no t-butyl alcohol was employed. A conversion of 3.5 percent of methacrylonitrile and a 100 percent yield of methacrylamide were obtained. This experiment is outside the scope of the present invention.

C. Procedure B. of this example was repeated except that lithium hydroxide was used in place of sodium hydroxide. A conversion of 3.7 percent of methacrylonitrile and a 100 percent of methacrylamide were obtained. This experiment is outside the scope of the present invention.

EXAMPLE X

A. Example IX A. was repeated except that a mixture of 0.007 mole of sodium hydroxide and 0.007 mole of lithium hydroxide was used as catalyst. The reaction produced a 28.6 percent conversion of methacrylonitrile and a 100 percent yield of methacrylamide.

B. Procedure A. of this example was repeated with the exception that no basic catalyst was employed. This experiment, which is outside the scope of the present invention, produced no conversion of the methacrylonitrile.

C. Procedure A. of this example was repeated except that 0.10 mole of triethyl amine was used in place of the lithium hydroxide-sodium hydroxide catalyst. No conversion of the methacrylonitrile was obtained. This experiment is outside the scope of the present invention.

EXAMPLE XI

Example IV was repeated except that 0.1 mole of lithium hydroxide was used. A conversion of 40.4 percent methacrylonitrile and a yield of 95 percent methacrylamide were obtained.

EXAMPLE XII

The procedure of Example I was repeated using acetonitrile, lithium hydroxide, water and t-butyl alcohol in the molar ratio of 1:0.07:4:1, respectively. Acetamide was produced in 25 percent conversion with a yield of greater than 90 percent.

EXAMPLE XIII

The procedure of Example XII was repeated using benzonitrile in place of acetonitrile. A 69 percent conversion and greater than 90 percent yield of benzamide were obtained.

EXAMPLE XIV

The procedure of Example XII was repeated using acrylonitrile in place of acetonitrile and 0.007 mole of lithium hydroxide. A total of 66.9 percent of the acrylonitrile was converted yielding 16.4 percent of acrylamide and 74.8 percent of hydracrylonitrile. Hydracrylonitrile can be recycled in this process to produce acrylamide and acrylonitrile.

We claim:

1. The process for converting a nitrile to the corresponding amide comprising reacting a nitrile selected from the group consisting of methacrylonitrile and acrylonitrile with water in the presence of an alkaline catalyst selected from the group consisting of lithium hydroxide, lithium carbonate, lithium bicarbonate, sodium hydroxide, sodium carbonate and sodium bicarbonate and a tertiary alcohol selected from the group consisting of t-butyl alcohol, t-amyl alcohol, the t-hexyl alcohols, the t-heptyl alcohols and the t-octyl alcohols and mixtures thereof at a temperature in the range of from about 135°C to 310°C and at a pressure in the range of from about atmospheric to about 1,500 p.s.i.g.

2. The process of claim 1 wherein there is present per mole of the nitrile from about 0.001 to 1.0 mole of alkaline catalyst, from about 1 to 10 moles of water, and from about 0.1 to 10 moles of tertiary alcohol.

3. The process of claim 2 wherein the tertiary alcohol is t-butyl alcohol.

4. The process of claim 3 wherein the nitrile is methacrylonitrile.

5. The process of claim 3 wherein the nitrile is acrylonitrile.

* * * * *